No. 712,999. Patented Nov. 4, 1902.
B. FORD.
STORAGE BATTERY.
(Application filed Aug. 28, 1900.)
(No Model.)
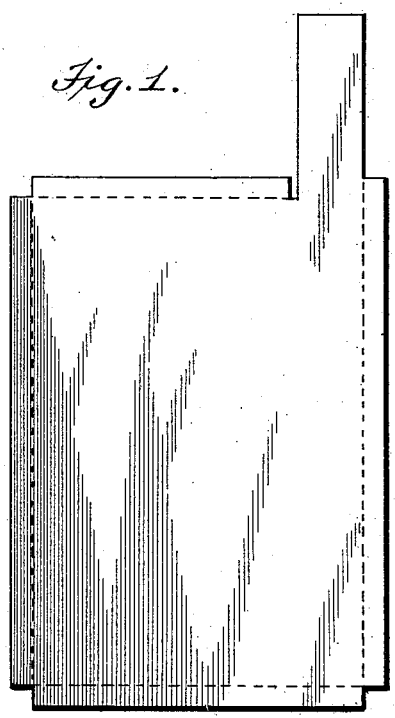
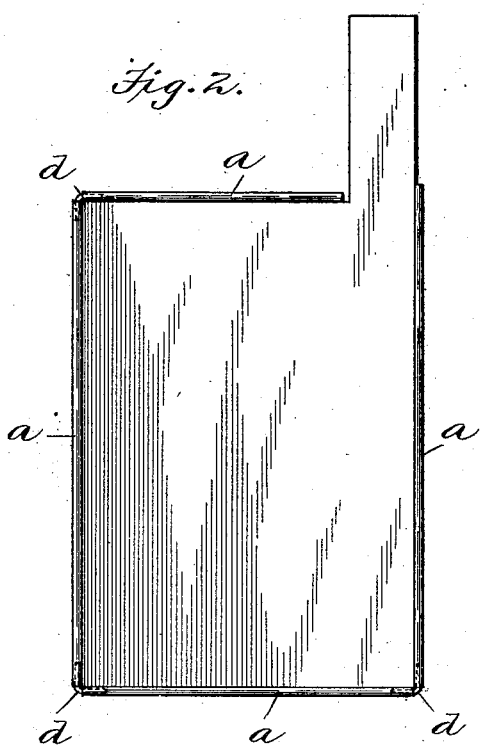
Witnesses
E. W. Hart
Jas. A. Richmond
Inventor
Bruce Ford.
By Augustus B. Stoughton
Attorney
THE NORRIS PETERS CO., PHOTO-LITHO., WASHINGTON, D. C.

UNITED STATES PATENT OFFICE.

BRUCE FORD, OF PHILADELPHIA, PENNSYLVANIA, ASSIGNOR TO ELECTRIC STORAGE BATTERY COMPANY, OF PHILADELPHIA, PENNSYLVANIA, A CORPORATION OF NEW JERSEY.

STORAGE BATTERY.

SPECIFICATION forming part of Letters Patent No. 712,999, dated November 4, 1902.

Application filed August 28, 1900. Serial No. 28,345. (No model.)

*To all whom it may concern:*

Be it known that I, BRUCE FORD, a citizen of the United States, residing at the city of Philadelphia, in the county of Philadelphia and State of Pennsylvania, have invented certain new and useful Improvements in Storage Batteries, of which the following is a specification.

The invention relates to storage-battery plates and supports therefor.

In the present state of the art the hard-rubber frame, which is applied in sections, is probably the best exemplification of means of support for a battery element; but this type is objectionable, inasmuch as it is expensive.

The object of my invention is to provide a battery-plate which shall be self-sustaining and which will be superior to all other types in respect to the economy it affords in manufacture and its general efficiency.

The invention consists in the improved battery-plate and in the novel features of construction thereof, as will be hereinafter pointed out, and defined in the claims.

The nature, characteristic features, and scope of the invention will be readily understood from the following description, taken in connection with the accompanying drawings, forming part hereof, and in which—

Figure 1 shows a blank for a battery-plate, the dotted lines defining the strips for forming the bead or tubular flange which constitutes a preferred means of carrying the invention into practice. Fig. 2 is a face view of a battery-plate provided with a bead, and Fig. 3 is a cross-section through the plate.

In the drawings, $a$ is a bead or flange formed by turning or folding the edges of a blank or sheet of suitable material, which may be rolled metal, as lead or an alloy thereof. This bead or flange $a$ if arranged with its axis in alinement with the plane of the support insures even distribution of the active material or material to become active, $b$, on each face of the plate or support. The bead or flange imparts the requisite stiffness to the plate or support and is also useful as a guide in the application of the active material. It is much cheaper than a frame of rubber and much more easily made. If desired, suitable wires, as $d$, may be inserted in the flange at the corners of the plate, so as to strengthen them.

It will be obvious to those skilled in the art to which the invention appertains that modifications may be made in detail without departing from the spirit thereof. Hence I do not limit myself to the precise construction and arrangement of parts hereinabove set forth, and illustrated in the accompanying drawings; but,

Having thus described the nature and objects of my invention, what I claim as new, and desire to secure by Letters Patent, is—

1. A flat battery-plate having its edge turned over to form a tubular bead constituting a support, for the active material or material to become active, substantially as described.

2. A flat battery-plate having its edges bent to constitute a hollow tubular bead the axis of which lies in the plane of the plate, and which constitutes a support for the active material or material to become active, substantially as described.

3. A battery-plate having its edges bent to form a hollow tubular bead and having wires inserted in said bead, substantially as described.

In testimony whereof I have hereunto signed my name.

BRUCE FORD.

In presence of—
W. J. JACKSON,
K. M. GILLIGAN.